US008170619B2

(12) United States Patent
Kim

(10) Patent No.: US 8,170,619 B2
(45) Date of Patent: May 1, 2012

(54) METHOD AND APPARATUS FOR DISPLAYING EVENT OF MOBILE TERMINAL

(75) Inventor: Min-Joo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 455 days.

(21) Appl. No.: 12/036,378

(22) Filed: Feb. 25, 2008

(65) Prior Publication Data

US 2008/0207274 A1 Aug. 28, 2008

(30) Foreign Application Priority Data

Feb. 27, 2007 (KR) .................. 10-2007-0019853

(51) Int. Cl.
*H04Q 7/32* (2006.01)

(52) U.S. Cl. .................. 455/566; 455/550.1; 455/556.1; 455/556.2; 455/575.1; 455/90.3; 345/162; 345/440; 345/440.2; 345/156; 345/157; 379/428.01; 379/433.01; 379/433.04

(58) Field of Classification Search .................. 455/566, 455/550.1, 557, 556.1, 556.2, 90.1–90.3, 455/414.1–414.4, 575.1; 345/346, 440, 440.2, 345/156, 157, 162; 379/428.01, 433.01, 379/433.04
See application file for complete search history.

(56) References Cited

U.S. PATENT DOCUMENTS 6,038,522 A * 3/2000 Manson et al. ............... 702/150
2002/0085034 A1 7/2002 Cortright
2004/0017376 A1 1/2004 Tagliabue et al.
2005/0075097 A1* 4/2005 Lehikoinen et al. ......... 455/414.1
2005/0138066 A1* 6/2005 Finke-Anlauff et al. .. 707/104.1
2006/0148528 A1* 7/2006 Jung et al. .................... 455/566
2007/0113251 A1* 5/2007 Otsu ............................... 725/56
2008/0146245 A1* 6/2008 Appaji ......................... 455/456.1

FOREIGN PATENT DOCUMENTS

| JP | 11-85450 A | 3/1999 |
| JP | 11-353369 A | 12/1999 |
| JP | 2001-202340 A | 7/2001 |
| JP | 2003-101895 A | 4/2003 |
| JP | 2005-309810 A | 11/2005 |
| JP | 2006-14002 A | 1/2006 |
| TW | 200634424 A | 10/2006 |
| TW | 200705298 A | 2/2007 |
| WO | WO 2005/033828 A2 | 4/2005 |
| WO | WO 2005/043373 A1 | 5/2005 |
| WO | WO 2006/070253 A2 | 7/2006 |

* cited by examiner

*Primary Examiner* — Keith Ferguson
(74) *Attorney, Agent, or Firm* — Birch, Stewart, Kolasch & Birch, LLP

(57) ABSTRACT

An event display apparatus and method of a mobile terminal are disclosed. The event display method of a mobile terminal includes: detecting events in the mobile terminal; displaying time graphics on a screen; and positioning the detected events on the time graph according to their types. Various scattered events in the mobile terminal are detected and displayed on the time graphics indicating time according to types of the detected events, so the events can be easily viewed and managed.

11 Claims, 12 Drawing Sheets

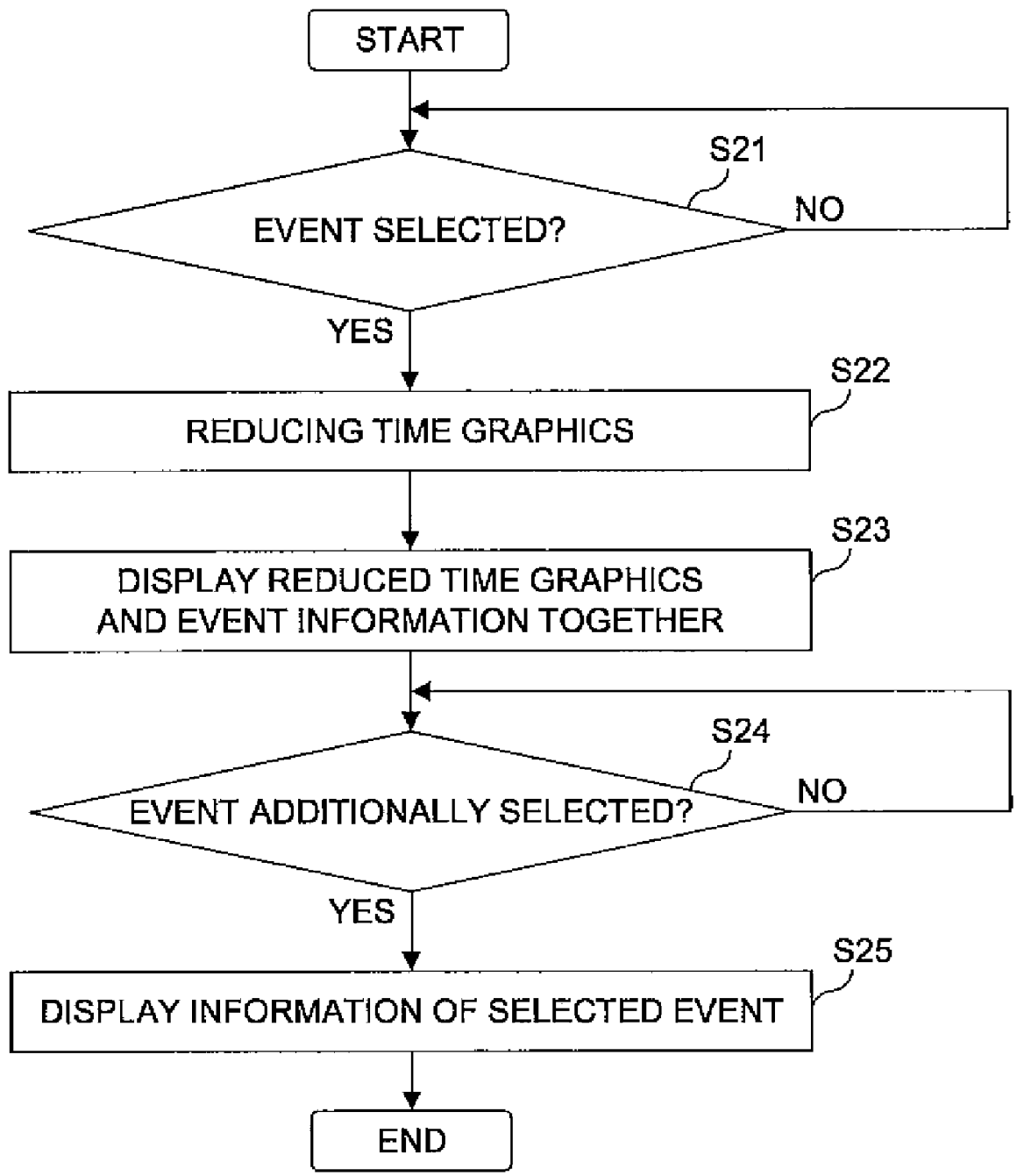

METHOD AND APPARATUS FOR DISPLAYING EVENT OF MOBILE TERMINAL

BACKGROUND

A method and apparatus for displaying an event of a mobile terminal is provided.

A mobile terminal is a device which may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components which form the mobile terminal.

The related art mobile terminals such as a mobile phone, a personal digital assistant (PDA), or the like, can record events such as a phone call or an absent (missed) call in a call list, and can also record message reception/transmission events. In addition, the related art mobile terminals can record schedule events in a schedule management storage location and can also record events such as an alarm function or a wake-up call.

However, in the related art mobile terminals, because the various events are recorded in a dispersed (scattered) manner, the user cannot easily check and manage numerous events.

SUMMARY

The present inventors recognized certain drawbacks of the related art, as explained above. Upon such recognition, the following concepts and features have been conceived.

An apparatus and a method for displaying events of a mobile terminal capable of allowing easy checking and management of various events by displaying the events in the form of a time line or so-called time graphics according to the types of events are provided herein.

Thus, an event display method of a mobile terminal includes: detecting events in the mobile terminal; displaying time graphics on a screen; and positioning the detected events on the time graph according to their types.

Also, an event display apparatus of a mobile terminal includes: a detector that detects events in the mobile terminal; and a controller that provides control to display time graphics on a display unit of the mobile terminal and position the detected events on the time graphics according to their types.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

FIG. 9 is a flow chart illustrating the process of a method for displaying information of various events displayed on the circular time lines by using the event display apparatus of the mobile terminal according to an exemplary embodiment;

DETAILED DESCRIPTION

An apparatus and method for displaying various types of events of a mobile terminal capable of allowing easy checking and management of such events by displaying the events in the form of a time line or so-called time graphics according to their types according to exemplary embodiments of the present invention will be described in more detail with reference to the accompanying drawings.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
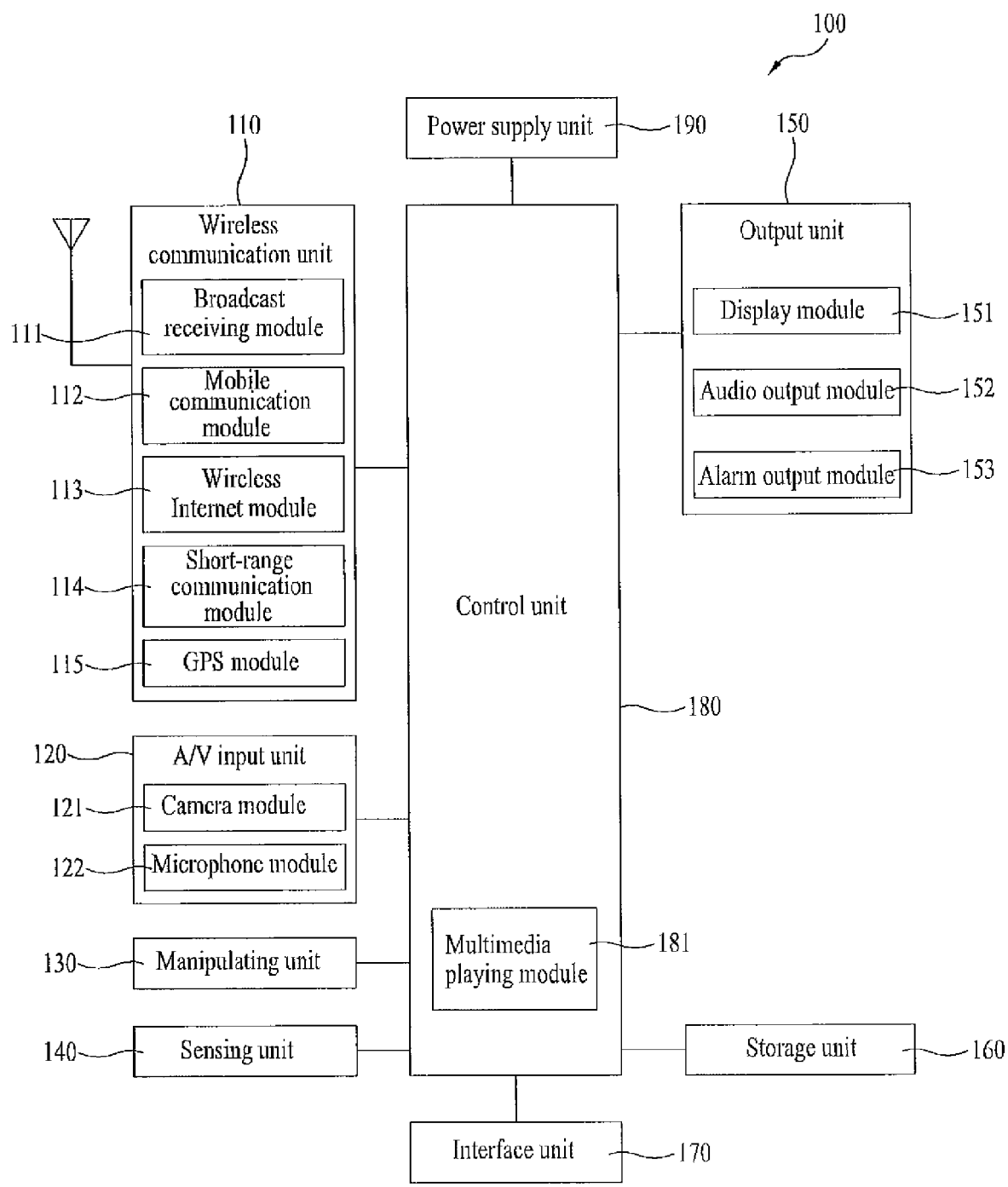
FIG. 1 is a block diagram of a mobile terminal in accordance with an embodiment of the present invention.

FIG. 1 is a block diagram of mobile terminal 100 in accordance with an embodiment of the present invention. The mobile terminal may be implemented using a variety of different types of terminals. Examples of such terminals include mobile phones, user equipment, smart phones, computers, digital broadcast terminals, personal digital assistants, portable multimedia players (PMP) and navigators. By way of non-limiting example only, further description will be with regard to a mobile terminal. However, such teachings apply equally to other types of terminals. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For instance, the wireless communication unit 110 typically includes one or more components which permits wireless communication between the mobile terminal 100 and a wireless communication system or network within which the mobile terminal is located.

The broadcast receiving module 111 receives a broadcast signal and/or broadcast associated information from an external broadcast managing entity via a broadcast channel. The broadcast channel may include a satellite channel and a terrestrial channel. The broadcast managing entity refers generally to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving of multicast signals is also possible. If desired, data received by the broadcast receiving module 111 may be stored in a suitable device, such as memory 160.

The mobile communication module 112 transmits/receives wireless signals to/from one or more network entities (e.g., base station, Node-B). Such signals may represent audio, video, multimedia, control signaling, and data, among others.

The wireless internet module 113 supports Internet access for the mobile terminal. This module may be internally or externally coupled to the terminal.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

Position-location module 115 identifies or otherwise obtains the location of the mobile terminal. If desired, this module may be implemented using global positioning system (GPS) components which cooperate with associated satellites, network components, and combinations thereof.

Audio/video (A/V) input unit 120 is configured to provide audio or video signal input to the mobile terminal. As shown, the A/V input unit 120 includes a camera 121 and a microphone 122. The camera receives and processes image frames of still pictures or video.

The microphone 122 receives an external audio signal while the portable device is in a particular mode, such as phone call mode, recording mode and voice recognition. This audio signal is processed and converted into digital data. The portable device, and in particular, A/V input unit 120, typically includes assorted noise removing algorithms to remove noise generated in the course of receiving the external audio signal. Data generated by the A/V input unit 120 may be stored in memory 160, utilized by output unit 150, or transmitted via one or more modules of communication unit 110. If desired, two or more microphones and/or cameras may be used.

The user input unit 130 generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touchscreen display (which will be described in more detail below).

The sensing unit 140 provides status measurements of various aspects of the mobile terminal. For instance, the sensing unit may detect an open/close status of the mobile terminal, relative positioning of components (e.g., a display and keypad) of the mobile terminal, a change of position of the mobile terminal or a component of the mobile terminal, a presence or absence of user contact with the mobile terminal, orientation or acceleration/deceleration of the mobile terminal. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

The interface unit 170 is often implemented to couple the mobile terminal with external devices. Typical external devices include wired/wireless headphones, external chargers, power supplies, storage devices configured to store data (e.g., audio, video, pictures, etc.), earphones, and microphones, among others. The interface unit 170 may be configured using a wired/wireless data port, a card socket (e.g., for coupling to a memory card, subscriber identity module (SIM) card, user identity module (UIM) card, removable user identity module (RUIM) card), audio input/output ports and video input/output ports.

The output unit 150 generally includes various components which support the output requirements of the mobile terminal. Display 151 is typically implemented to visually display information associated with the mobile terminal 100. For instance, if the mobile terminal is operating in a phone call mode, the display will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

One particular implementation includes the display 151 configured as a touch screen working in cooperation with an input device, such as a touchpad. This configuration permits the display to function both as an output device and an input device.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal may include one or more of such displays. An example of a two-display embodiment is one in which one display is configured as an internal display (viewable when the terminal is in an opened position) and a second display configured as an external display (viewable in both the open and closed positions).

FIG. 1 further shows output unit 150 having an audio output module 152 which supports the audio output requirements of the mobile terminal 100. The audio output module is often implemented using one or more speakers, buzzers, other audio producing devices, and combinations thereof. The audio output module functions in various modes including call-receiving mode, call-placing mode, recording mode, voice recognition mode and broadcast reception mode. During operation, the audio output module 152 outputs audio relating to a particular function (e.g., call received, message received, and errors).

The output unit 150 is further shown having an alarm 153, which is commonly used to signal or otherwise identify the occurrence of a particular event associated with the mobile terminal. Typical events include call received, message received and user input received. An example of such output includes the providing of tactile sensations (e.g., vibration) to a user. For instance, the alarm 153 may be configured to vibrate responsive to the mobile terminal receiving a call or message. As another example, vibration is provided by alarm 153 responsive to receiving user input at the mobile terminal, thus providing a tactile feedback mechanism. It is understood that the various output provided by the components of output unit 150 may be separately performed, or such output may be performed using any combination of such components.

The memory 160 is generally used to store various types of data to support the processing, control, and storage requirements of the mobile terminal. Examples of such data include program instructions for applications operating on the mobile terminal, contact data, phonebook data, messages, pictures, video, etc. The memory 160 shown in FIG. 1 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 typically controls the overall operations of the mobile terminal. For instance, the controller performs the control and processing associated with voice calls, data communications, video calls, camera operations and recording operations. If desired, the controller may include a multimedia module 181 which provides multimedia playback. The multimedia module may be configured as part of the controller 180, or this module may be implemented as a separate component.

The power supply 190 provides power required by the various components for the portable device. The provided power may be internal power, external power, or combinations thereof.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, memory 160), and executed by a controller or processor (for example, controller 180).

Mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal. However such teachings apply equally to other types of terminals.

Figure 2:
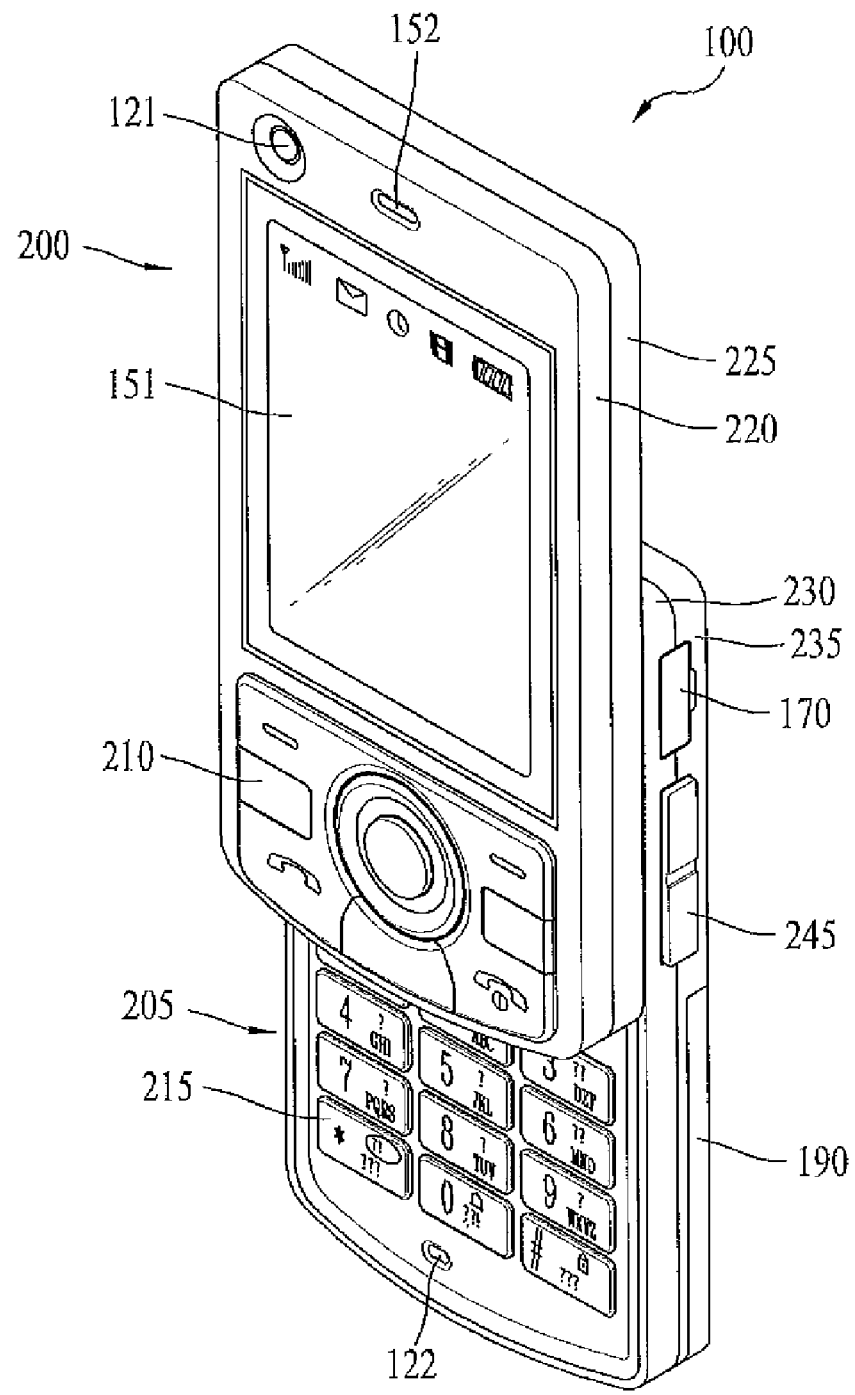
FIG. 2 is a perspective view of a front side of a mobile terminal according to an embodiment of the present invention.

FIG. 2 is a perspective view of a front side of a mobile terminal according to an embodiment of the present invention. In FIG. 2, the mobile terminal 100 is shown having a first body 200 configured to slideably cooperate with a second body 205. The user input unit (described in FIG. 1) is implemented using function keys 210 and keypad 215. The function keys 210 are associated with first body 200, and the keypad 215 is associated with second body 205. The keypad includes various keys (e.g., numbers, characters, and symbols) to enable a user to place a call, prepare a text or multimedia message, and otherwise operate the mobile terminal.

The first body 200 slides relative to second body 205 between open and closed positions. In a closed position, the first body is positioned over the second body in such a manner that the keypad 215 is substantially or completely obscured by the first body 200. In the open position, user access to the keypad 215, as well as the display 151 and function keys 210, is possible. The function keys are convenient to a user for entering commands such as start, stop and scroll.

The mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. This mode configuration may be changed as required or desired.

The first body 200 is shown formed from a first case 220 and a second case 225, and the second body 205 is shown formed from a first case 230 and a second case 235. The first and second cases are usually formed from a suitably ridge material such as injection molded plastic, or formed using metallic material such as stainless steel (STS) and titanium (Ti).

If desired, one or more intermediate cases may be provided between the first and second cases of one or both of the first and second bodies 200, 205. The first and second bodies 200, 205 are typically sized to receive electronic components necessary to support operation of the mobile terminal 100.

The first body 200 is shown having a camera 121 and audio output unit 152, which is configured as a speaker, positioned relative to the display 151. If desired, the camera 121 may be constructed in such a manner that it can be selectively positioned (e.g., rotated, swiveled, etc.) relative to first body 200.

The function keys 210 are positioned adjacent to a lower side of the display 151. The display 151 is shown implemented as an LCD or OLED. Recall that the display may also be configured as a touchscreen having an underlying touchpad which generates signals responsive to user contact (e.g., finger, stylus, etc.) with the touchscreen.

Second body 205 is shown having a microphone 122 positioned adjacent to keypad 215, and side keys 245, which are one type of a user input unit, positioned along the side of second body 205. Preferably, the side keys 245 may be configured as hot keys, such that the side keys are associated with a particular function of the mobile terminal. An interface unit 170 is shown positioned adjacent to the side keys 245, and a power supply 190 in a form of a battery is located on a lower portion of the second body 205.

Figure 3:
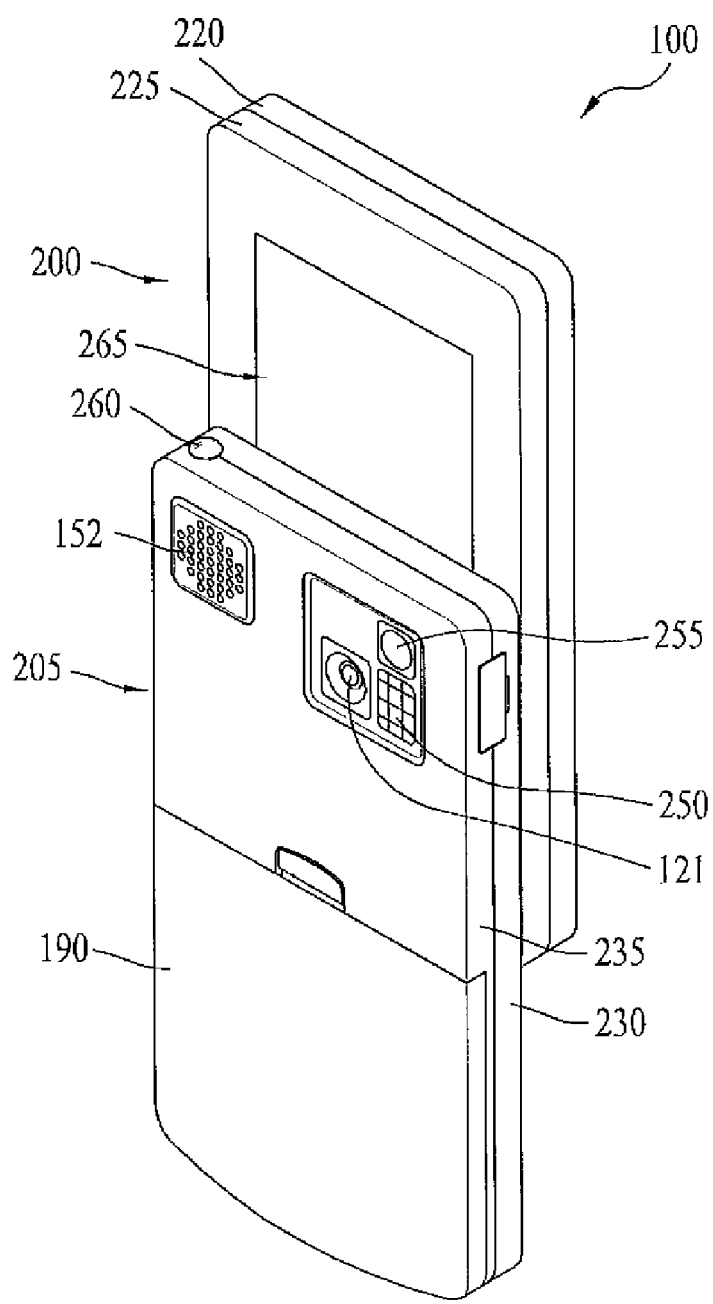
FIG. 3 is a rear view of the mobile terminal shown in FIG. 2.

FIG. 3 is a rear view of the mobile terminal shown in FIG. 2. FIG. 3 shows the second body 205 having a camera 121, and an associated flash 250 and mirror 255. The flash operates in conjunction with the camera 121 of the second body. The mirror 255 is useful for assisting a user to position camera 121 in a self-portrait mode. The camera 121 of the second body faces a direction which is opposite to a direction faced by camera 121 of the first body 200 (FIG. 2). Each of the cameras 121 of the first and second bodies may have the same or different capabilities.

In an embodiment, the camera of the first body 200 operates with a relatively lower resolution than the camera of the second body 205. Such an arrangement works well during a video conference, for example, in which reverse link bandwidth capabilities may be limited. The relatively higher resolution of the camera of the second body 205 (FIG. 3) is useful for obtaining higher quality pictures for later use or for communicating to others.

The second body 205 also includes an audio output module 152 configured as a speaker and which is located on an upper side of the second body. If desired, the audio output modules of the first and second bodies 200, 205, may cooperate to provide stereo output. Moreover, either or both of these audio output modules may be configured to operate as a speakerphone.

A broadcast signal receiving antenna 260 is shown located at an upper end of the second body 205. Antenna 260 functions in cooperation with the broadcast receiving module 111 (FIG. 1). If desired, the antenna 260 may be fixed or configured to retract into the second body 205. The rear side of the first body 200 includes slide module 265, which slideably couples with a corresponding slide module located on the front side of the second body 205.

It is understood that the illustrated arrangement of the various components of the first and second bodies 200, 205, may be modified as required or desired. In general, some or all of the components of one body may alternatively be implemented on the other body. In addition, the location and relative positioning of such components are not critical to many embodiments, and as such, the components may be positioned at locations which differ from those shown by the representative figures.

The mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
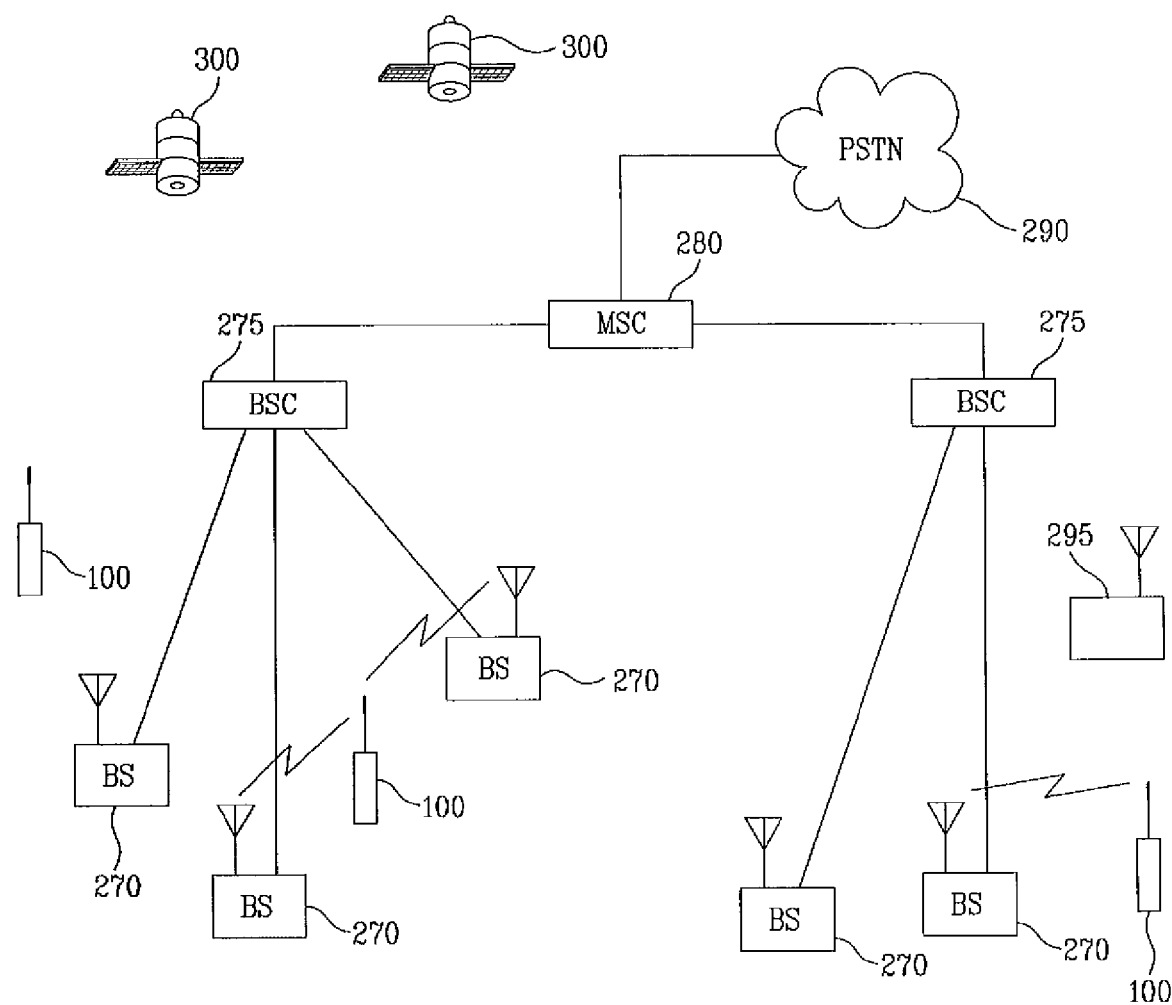
FIG. 4 is a block diagram of a CDMA wireless communication system operable with the mobile terminal of FIGS. 1-3.

Referring now to FIG. 4, a CDMA wireless communication system is shown having a plurality of mobile terminals 100, a plurality of base stations 270, base station controllers (BSCs) 275, and a mobile switching center (MSC) 280. The MSC 280 is configured to interface with a conventional public switch telephone network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations may also be denoted "cell sites." Alternatively, individual sectors of a given base station 270 may be referred to as cell sites.

A terrestrial digital multimedia broadcasting (DMB) transmitter 295 is shown broadcasting to portable terminals 100 operating within the system. The broadcast receiving module 111 (FIG. 1) of the portable terminal is typically configured to receive broadcast signals transmitted by the DMB transmitter 295. Similar arrangements may be implemented for other types of broadcast and multicast signaling (as discussed above).

FIG. 4 further depicts several global positioning system (GPS) satellites 300. Such satellites facilitate locating the position of some or all of the portable terminals 100. Two satellites are depicted, but it is understood that useful positioning information may be obtained with greater or fewer satellites. The position-location module 115 (FIG. 1) of the portable terminal 100 is typically configured to cooperate with the satellites 300 to obtain desired position information. It is to be appreciated that other types of position detection technology, (i.e., location technology that may be used in addition to or instead of GPS location technology) may alternatively be implemented. If desired, some or all of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and other communications. Each reverse-link signal received by a given base station 270 is processed within that base station. The resulting data is forwarded to an associated BSC 275. The BSC provides call resource allocation and mobility management functionality including the orchestration of soft handoffs between base stations 270. The BSCs 275 also route the received data to the MSC 280, which provides additional routing services for interfacing with the PSTN 290. Similarly, the PSTN interfaces with the MSC 280, and the MSC interfaces with the BSCs 275, which in turn control the base stations 270 to transmit sets of forward-link signals to the mobile terminals 100.

Figure 5:
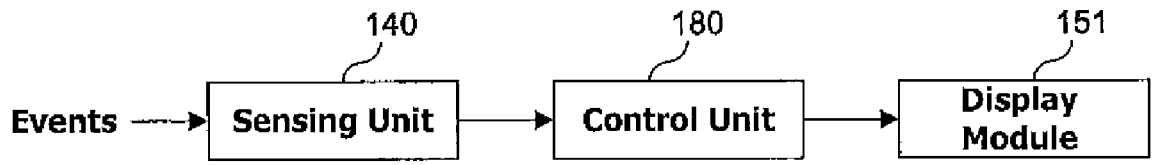
FIG. 5 is a block diagram showing the configuration of an event display apparatus of a mobile terminal according to an exemplary embodiment.

FIG. 5 is a block diagram showing the configuration of an event display apparatus of a mobile terminal according to an exemplary embodiment. The event display apparatus of a mobile terminal according to an exemplary embodiment may be applicable for mobile terminals such as mobile phones, PDAs, PMPs (Portable Multimedia Players), or the like.

With reference to FIG. 5, the event display apparatus of a mobile terminal according to an exemplary embodiment of the present invention may include a sensing unit 140 that detects various events occurring in the mobile terminal; and a control unit 180 that provides control to display previously stored time graphics on a display module 151 of the mobile terminal and position the detected events on the time graphics according their types. Here, the events can be refer to various events that may occur in the mobile terminal, such as a call reception/transmission, an absent (or missed) call, a message reception/transmission, schedule/alarm/wake-up call, etc., The sol-called time graphics (which refer to particular types of graphical formats that allow the user to easily view time related information) may include multiple time lines. The multiple time lines may indicate time, and the size, shape and width of the multiple time lines may be displayed in different ways to allow distinguishability.

The control unit 180 may provide control to display the detected events on the time lines of the time graphics based on the time information of the detected events. For example, if a detected event has occurred at 5:00 p.m., the control unit 180 may provide control to display the detected event at the position of 5:00 p.m. of the time lines of the time graphics. The time lines may be set to indicate a 24-hour time format or a 12-hour time format according to the user's selection.

The control unit 180 may provide control to display circular-shaped time lines (such as concentric circles) on the display module 151, display time lines in a chart (or grid-like) format on the display module 151, or display spiral (or other geometric) time lines on the display module 151.

The control unit 180 may provide control to display the events detected by the sensing unit 140 on the circular time line, on the chart-type time lines, on the spiral time lines, or the like. For example, the control unit 180 may provide control to display the respective events as icons (or other graphical indicators) and position the displayed icons at appropriate locations on the time lines. Accordingly, the events (that are represented by icons) positioned on the time lines have a certain time order or sequence. Here, the control unit 180 may provide control to display the respective icons on the time lines or at positions adjacent to the time lines.

The operation of the event display apparatus of the mobile terminal according to an exemplary embodiment will now be described with reference to FIG. 6.

Figure 6:
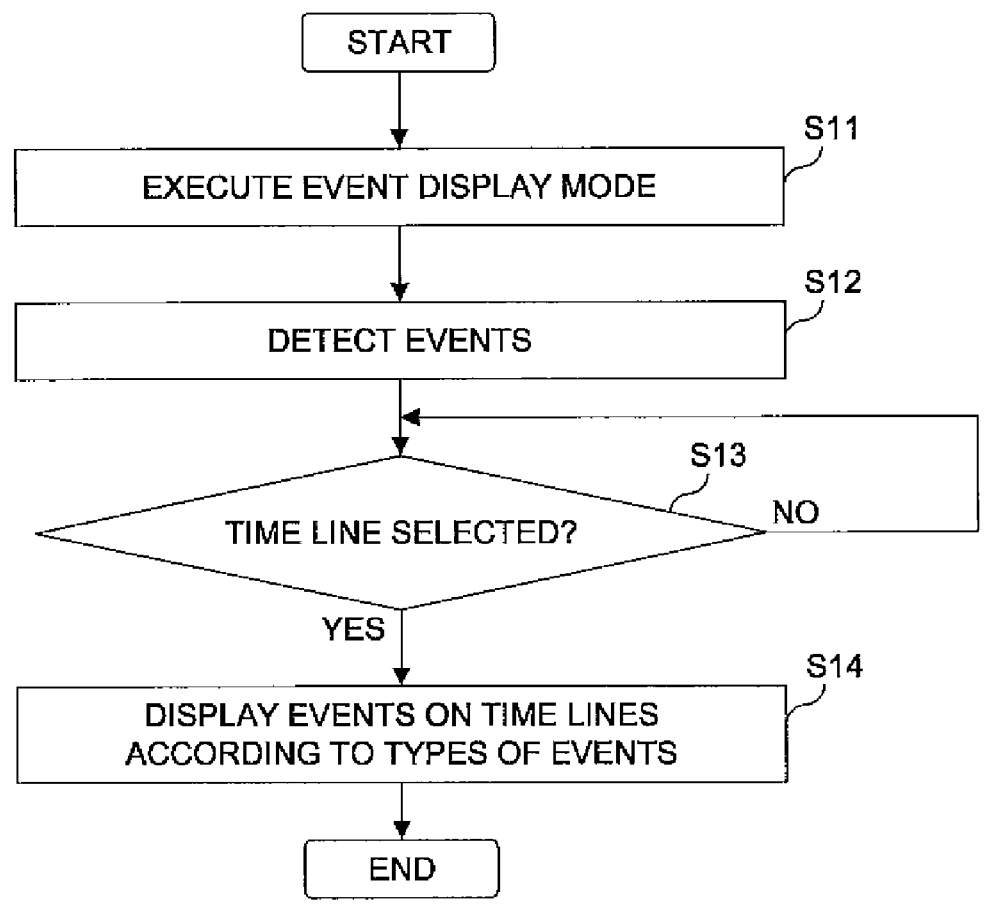
FIG. 6 is a flow chart illustrating the process of an event display method of a mobile terminal according to an exemplary embodiment.

FIG. 6 is a flow chart illustrating the process of an event display method of a mobile terminal according to an exemplary embodiment of the present invention.

First, when the mobile terminal is changed to an event display mode by the user (S11), the sensing unit 140 detects various events occurring (or stored) in the mobile terminal, and outputs the detected events to the control unit 180. For example, the sensing unit 140 may detect call reception/transmission events, absent (or missed) call events, message reception/transmission events, events such as schedule/alarm/wake-up call/tasks/D-day, etc., reserved message events, or the like, and output the detected events to the control unit 180.

When one of the time lines is selected by the user among the circular time lines, chart-type time lines, the spiral time lines, or the like (S13), the control unit 180 may provide control to display the selected time lines on the display module 151 and display the detected events on the displayed time line according to types of the events (S14).

For example, if a circular time line is selected by the user, the control unit 180 may provide control to display the selected circular time line on the display module 151 and position icons corresponding to the detected events on the circular time line displayed on the display module 151. If a chart-type time line is selected by the user, the control unit 180 may provide control to display the selected chart-type time line on the display module 151 and position the icons corresponding to the detected events on the chart-type time line displayed on the display module 151. If the spiral time line is selected by the user, the control unit 180 may provide control to display the spiral time line on the display module 151 and position the icons corresponding to the detected events on the spiral time line displayed on the display module 151.

When a particular icon positioned on the time line is selected by the user, the controller may provide control to execute a (software) program (or codes, instructions, etc.) linked to (or associated with) the selected particular icon. Various procedures for executing the icon-linked programs may be employed.

Meanwhile, if a particular event displayed on the time graphics is selected by the user, the control unit 180 may provide control to execute/change the selected particular event according to the user's request, and display detailed information and/or brief information of the selected particular event on the display module 151.

The method of displaying various events on the circular time line according to the types of events by using the event display apparatus of the mobile terminal according an exemplary embodiment of the present invention will now be described with reference to FIG. 7.

Figure 7:
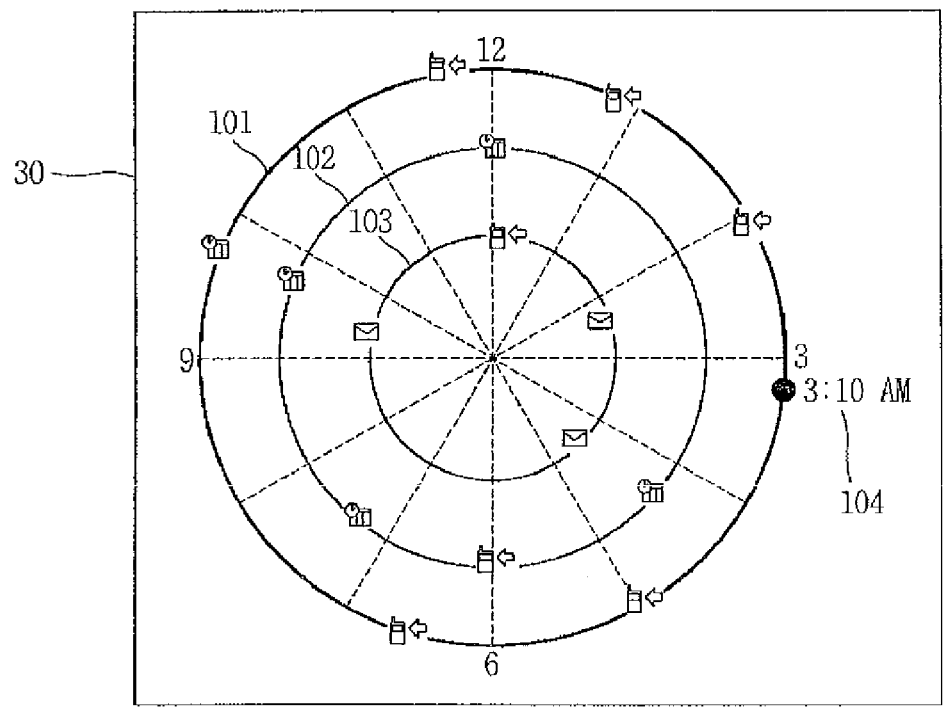
FIG. 7 is a view illustrating a method for displaying various events on circular time lines according to types of the events by using the event display apparatus of a mobile terminal according to an exemplary embodiment.

FIG. 7 is a view illustrating a method for displaying various events on circular time lines according to types of the events by using the event display apparatus of a mobile terminal according to the exemplary embodiment.

As shown in FIG. 7, the control unit 180 may provide control to display the circular time lines 101~203 (time graphics) selected by the user on the display module 151. In addition, the control unit 180 may provide control to display the icons indicating call reception/transmission events outputted from the sensing unit 140, icons indicating absent (or missed) call events, icons indicating message reception/transmission events, icons indicating events such as schedule/alarm/wake-up call/tasks/D-day, etc., and icons indicating reserved message events according to types of the events.

The time graphics may include multiple circular time lines 101~103 indicating particular time values. In this case, the control unit 180 may provide is control to position the icons indicating the call reception events on the first time line 101, the icons indicating the schedule reception events on the second time line 102, or the icons indicating message events on the third time line 103. Here, the first to third time lines may be set to have a different size, a different width or other graphical characteristics, respectively. In addition, the control unit 180 may provide control to position events selected according to a user request on the time lines selected by the user.

The control unit 180 may provide control to display a current time 104 on the time line. In this case, the current time may be displayed on one or more of the multiple time lines. In addition, the control unit 180 may provide control to change the size (or other graphical characteristics) of respective events (icons) displayed on the display module 151. For example, when a reserved time of a certain event positioned on the time line approaches, the control unit 180 may provide control to increase or reduce the size of the icon of the schedule event such that more intuitive and visually appealing graphics are displayed.

When the user positions a cursor (or other indicator) on a particular icon (e.g., the schedule icon), the control unit 180 may provide control to display summary information 106 through a pop-up window (or other viewable format) on the display module 151. When the user clicks (or otherwise activates) the particular icon, the control unit 180 may provide control to display detailed information of the schedule icon on the display module 151.

When an up/down direction key (or other types of input means) installed on a keypad of the mobile phone is selected by the user, the control unit 180 may provide control to move the cursor from one circular time line to another circular time line. Accordingly, the user can select a desired circular time line by using the is up/down direction key or other manipulation means.

When a left/right direction key (or other manipulation means) on the keypad (or input device) is selected (or operated) by the user, the control unit 180 may provide control to move the cursor along the circular time line. Accordingly, the user can select the icon positioned on the desired circular time line by using the left/right direction key (or the like) to thus easily check and manage the particular event. Here, the control unit 180 may provide control to select an icon requested by the user via a touch screen or display a time line requested by the user on the touch screen.

The control unit 180 may provide control to classify the time lines of the time graphics according to the types of events (e.g., messages, calls, schedules, call recipient (callees), etc.), and set an event requested by the user at the classified time lines. For example, the control unit 180 may set the first time line 101 as a call recipient time line according to a user request, and the second time line 102 as a schedule management time line according to a user request, and the third time line 103 as a message management time line according to a user request.

Thereafter, when the first time line 101 for a call recipient is selected by the user, the control unit 180 may provide control to display an icon corresponding to caller recipient information on the call recipient first time line 101. Here, when the call recipient information corresponding to a date requested by the user is selected, the control unit 180 may provide control to display an icon corresponding to the selected call recipient information on the call recipient first time line 101.

When the schedule management second time line 102 is selected by the user, the control unit 180 may provide control to display an icon corresponding to schedule information on the schedule management second time line 102. Here, when the schedule information corresponding to a date requested by the user is selected, the control unit 180 may provide control to display an icon corresponding to the selected schedule information on the schedule management second time line 102.

If the message management third time line 103 is selected by the user, the control unit 180 may provide control to display an icon corresponding to message information on the message management third time line 103. Here, when the message information corresponding to the date requested by the user is selected, the control unit 180 may provide control to display an icon corresponding to the selected message information on the message management third time line 103.

If a particular phone number or contact information, such as an e-mail address (e.g., a contact number to which the user frequently performs call communication) is selected by the user, the control unit 180 may provide control to display an icon corresponding to the selected phone number on the time line. For example, the control unit 180 may set the first time line 101 as a phone number time line according to a user request, and when the particular phone number is selected by the user, the control unit 180 may provide control to display the icon corresponding to the selected phone number on the first time line 101 based on reception time information of the selected phone number. Accordingly, when the particular phone number selected by the user is a phone number of calls which are received many times on average per day, the time at which the call of the phone number is received can be easily checked and managed through the phone number time line 101. In addition, when a particular name of a person is selected by the user, the control unit 180 may provide control to display an icon corresponding to a message received in the name of the selected person or a corresponding phone number on a particular time line.

The control unit 180 may provide control to display icons in sequential order, starting from the person with which the user has performed call communication most frequently. For example, the control unit 180 may provide control to count the number of receptions or transmissions of the same phone numbers performed on a date selected by the user and display the name of persons corresponding to the phone numbers in sequential order, starting from the person from or to which calls have been most frequently received or sent based on the counted number in the order of time lines, starting from the innermost or outermost time line. Alternatively, the name of persons corresponding to the phone numbers can be displayed in the order, starting from the person from or to which calls have been least frequently received or originated (sent) based on the counted number in the order of time lines, starting from the innermost or outermost time line. In this case, when the name of a person displayed on the time line is selected, the control unit 180 may provide control to display the number of calls, the number of messages, or other information corresponding to the name of the person at a lower side (or other location) of the time graphics. In this case the control unit 180 may provide control to display symbolical icons (such as crowns, stars, etc.) corresponding to the most frequently received or originated call number, or register the name of the person corresponding to the phone number to or from which calls have been mostly frequently sent or received, to visually denote that such person is important.

The control unit 180 may provide control to set the name (or other indicator) of a person on the time line. For example, the control unit 180 may provide control to set the first time line 101 as the name of a first person, the second time line 102 as the name of a second person, or the third time line 103 as the name of a third person according to a user request. In this case, when the first time line 101 is selected, the control unit 180 may provide control to display an icon corresponding to a phone number or a message received or originated in the name of the first person on the first time line according to a reception or sent time of the phone number, and display the number of calls or messages corresponding to the name of the first person at the lower side (or other location) of the time graphics. The color, shape or other graphical characteristics of the icon corresponding to the name of the person may vary according to the name of the person and according to user preference. Here, the control unit 180 may provide control to display the photo, video, or other image of the person on the icon corresponding to the name of the person.

The control unit 180 may provide control to reduce or increase the graphical width of a portion of the displayed time graphics according to the lifestyle (or characteristics, preference) of a particular person. Namely, when an event occurs at a particular time zone, the control unit 180 may provide control to display a wider particular time zone of the time graphics while display the time graphics corresponding to other time zone than the particular time zone narrowly. For example, if events of a particular person that largely occur during the day is desired to be displayed on the time graphics, the control unit 180 may provide control to narrowly display the time width of the time graphics corresponding to night time zones and widely display the time width of the time graphics corresponding to day time zones in order to display all the icons corresponding to the events of the particular person occurring largely during the day on the time graphics. Namely, in displaying the events of a person who do activities mainly daytime, rather than from midnight to 6:00 a.m., the control unit 180 may provide control to narrowly display the width of the time line corresponding to when the user is sleeping (i.e., sleep time) time and widely display the time line corresponding to when the user is awake (i.e., active time). Accordingly, the user may easily view the events occurring during the day and his activity time on a daily basis.

The method of displaying information of a particular event selected according to a user request when the particular event displayed on the time graphics is selected by the user will now be described with reference to FIGS. 5, 8 and 9.

Figure 8:
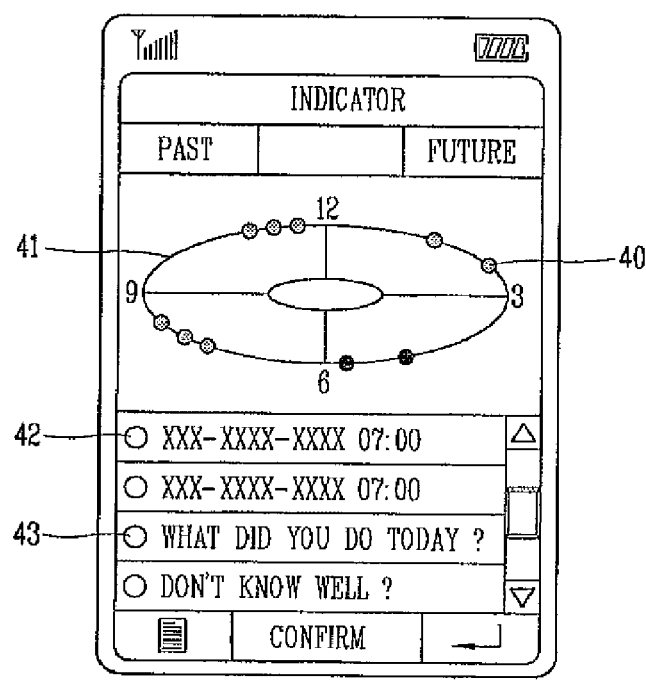
FIG. 8 is a view showing a screen image of time graphics and events displayed on a display unit of the mobile terminal according to an exemplary embodiment.

FIG. 8 is a view showing a screen image of time graphics and events displayed on a display unit of the mobile terminal according to an exemplary embodiment of the present invention.

FIG. 9 is a flow chart illustrating the process of a method for displaying information of various events displayed on the circular time lines by using the event display apparatus of the mobile terminal according to an exemplary embodiment of the present invention.

First, the control unit 180 may determine whether an event 40 displayed on the time graphics is selected by the user (S21).

When the event 40 displayed on the time graphics is selected by the user, the control unit 180 may provide control to reduce the amount or display characteristics of the time graphics including the event (S22) and display the reduced time graphics 41 together with information 42 and 43 of the selected events together on the display module 151. Here, if the selected events are message events, the control unit 180 may provide control to display a phone number(s) 42 and a text message(s) 43 included in the message events at a lower side (or other portions) of the reduced time graphics 41.

The reduced time graphics 41 may be displayed on various portions of the display module 151, and the information 42 and 43 of the user selected events may also be displayed on various portions of the display module 151. Accordingly, the user can view the time graphics including the events and the detailed information or summary information of the events together displayed on the screen of the display module 151.

Thereafter, the control unit 180 may determine whether an event is additionally selected by the user among the events displayed on the reduced time graphics 41 (S24).

When a particular event is additionally selected by the user among the events displayed on the reduced time graphics 41, the control unit 180 may provide control to display information of the selected event on the reduced time graphics 41 (S25). In this case, because there is no need to further reduce (or minimize) the reduced time graphics 41, detailed information or summary information about the event selected by the user can be easily and quickly displayed on the display module 151 (which may have one or more screens).

A method of easily displaying a broadcast program information (e.g., an so electronic program guide (EPG), or the like) on the display module 151 according to a user request by linking the time graphics and the broadcast program information will now be described with reference to FIGS. 5 and 10a to 11.

Figure 10A:
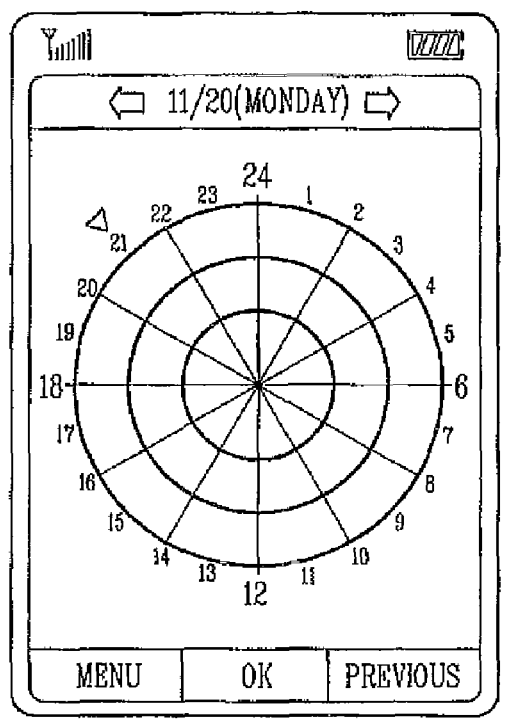
FIGS. 10a and 10b are views showing screen images of time graphics and broadcast program information displayed on the display unit of the mobile terminal according to an exemplary embodiment.
Figure 10B:
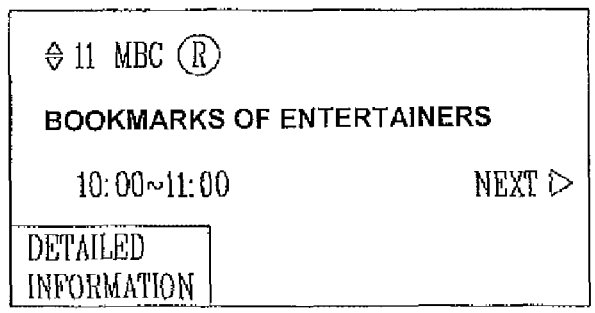

FIGS. 10a and 10b are views showing screen images of time graphics and broadcast program information displayed on the display unit of the mobile terminal according to an exemplary embodiment of the present invention.

Figure 11:
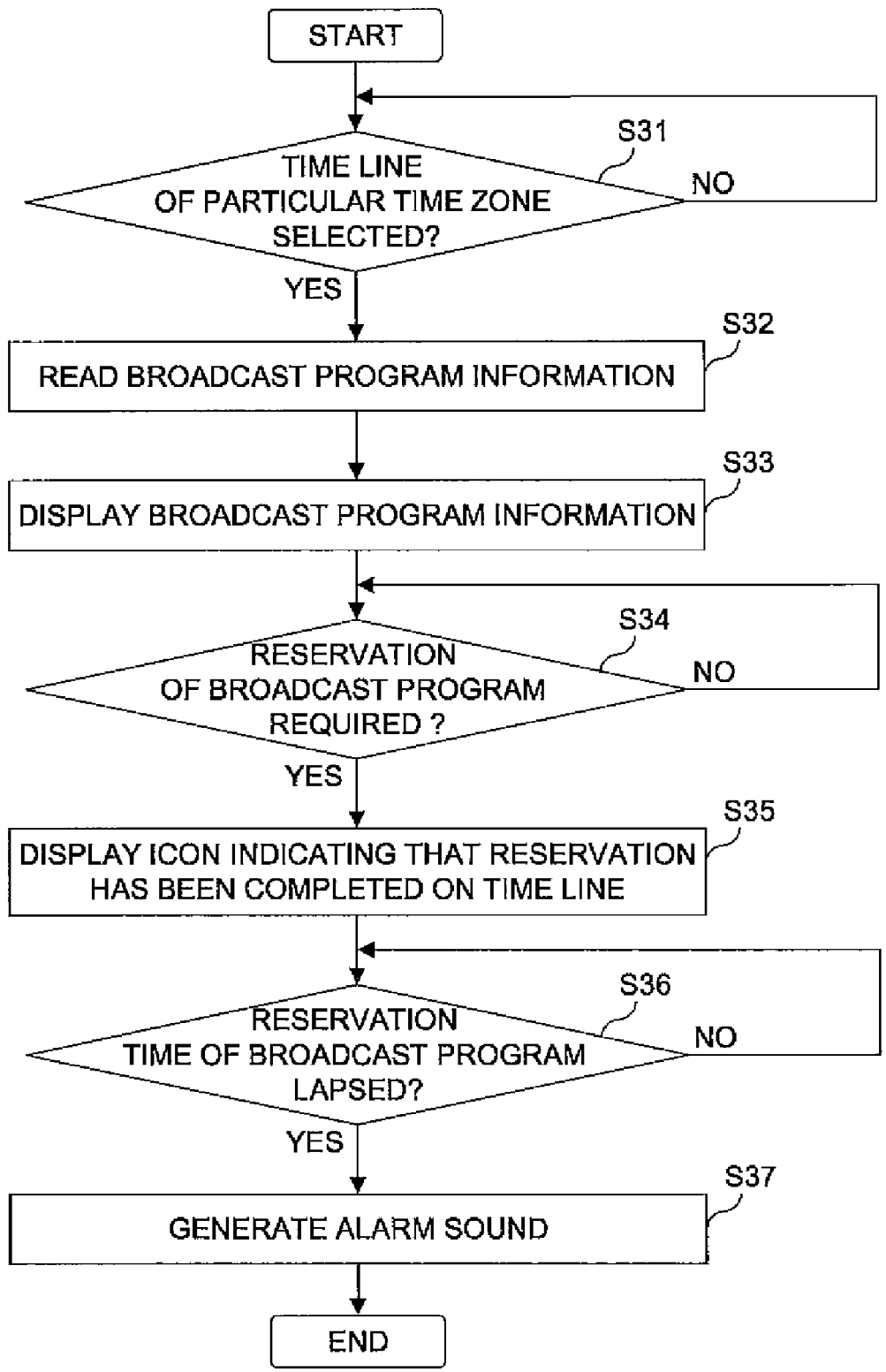
FIG. 11 is a flow chart illustrating the process of a method for displaying broadcast program information linked to the circular time lines by using the event display apparatus of the mobile terminal according to an exemplary embodiment.

FIG. 11 is a flow chart illustrating the process of a method for displaying broadcast program information liked to the circular time lines by using the event display apparatus of the mobile terminal according to an exemplary embodiment of the present invention.

First, the control unit 180 checks whether a time line of a particular time zone (or time period) is selected by the user (S31). Here, the broadcast program information is previously linked to the time line based on broadcast program time information included in the broadcast program information.

When a time line of a particular time zone is selected by the user, the control unit 180 may provide control to read broadcast program information corresponding to the selected time zone from a storage unit or memory (S32), and display the read broadcast program information 60 on the display module 151 (S33). Here, the user may select the time line of the particular time zone via a touch screen, a particular key (e.g., a hot key, etc.), or the like.

The broadcast program information may be previously stored in the storage unit (i.e., internal and/or external memory) of the mobile terminal and may be a terrestrial DMB (Digital Multimedia Broadcasting), satellite DMB program, or the like. For example, when the time line of the particular time zone is selected by the user, the control unit 180 may provide control to reduce (or minimize) the time graphics and display the broadcast program information at a lower side (or other portion) of the reduced time graphics. Here, the broadcast program information may include the title of the broadcast program, a start and end time of the broadcast program, broadcast channel information, and the like.

Thereafter, when the time line of the particular time zone is selected by the user, the control unit 180 checks whether the user requests reservation of the broadcast program corresponding to the selected time zone (S34).

When the user requests reservation of the broadcast program corresponding to the selected time zone, the control unit 180 may provide control to reserve the requested broadcast program and display an icon indicating that reservation of the broadcast program has been completed on the time line corresponding to the time zone. (S35). Here, the controller may provide control to change the icon indicating that the broadcast program has been reserved in various graphical shapes or delete the icon according to a user request.

The control unit 180 checks whether a broadcast start time of the reserved broadcast program will lapse (S36). If the broadcast start time of the reserved broadcast program is reached (or is upcoming), the control unit 180 may provide control to generate an alarm sound (or other audible, visual or tactile output) to inform the user about a start time of the broadcast program (S37).

A method of easily editing (changing, deleting, generating, moving, etc.) icons by the user by editing the icons positioned on the time graphics will now be described with reference to FIGS. 5 and 12 to 14.

Figure 12:
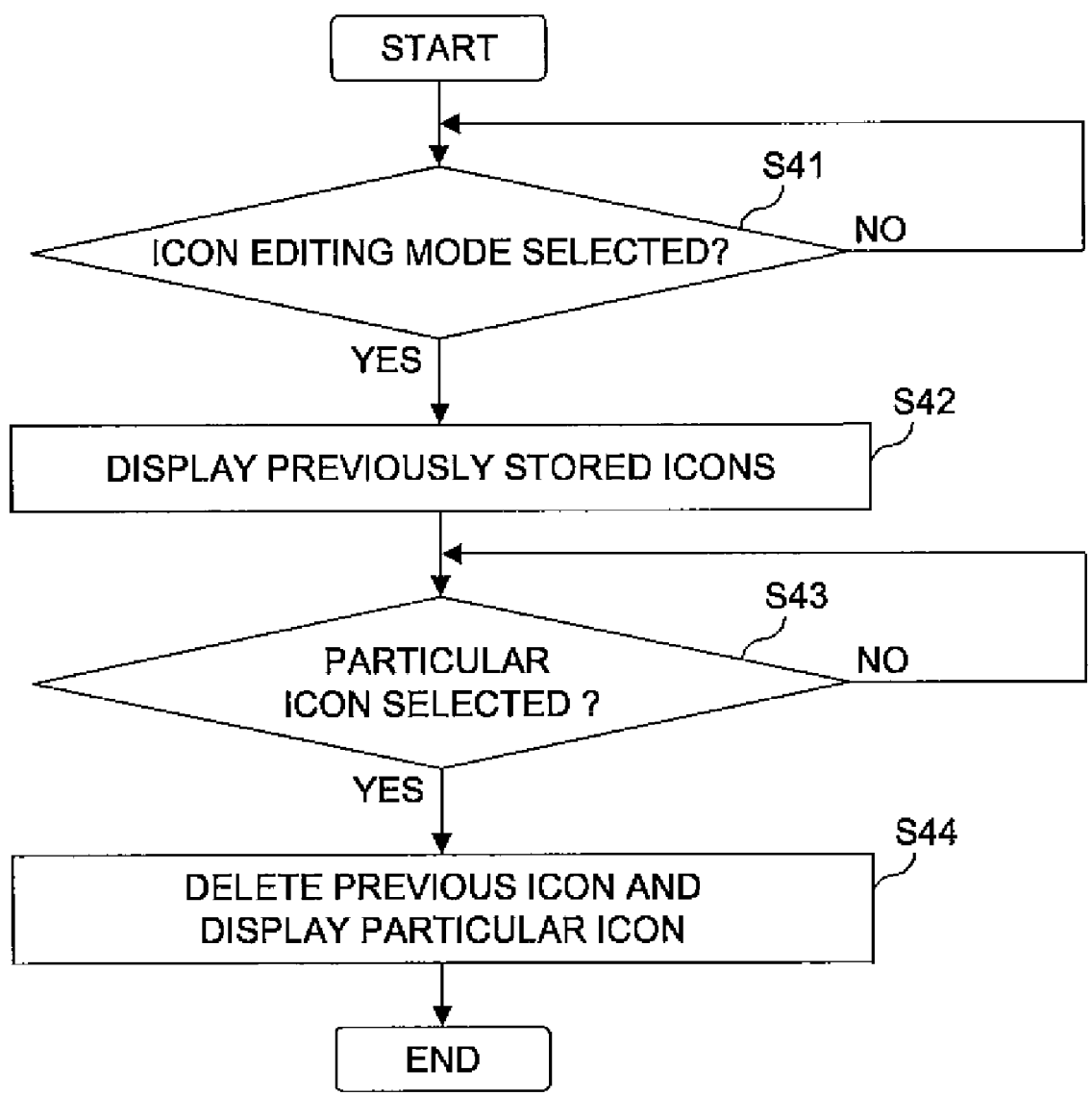
FIG. 12 is a flow chart illustrating the process of a method for changing an icon positioned on the time graphics by using the event display apparatus of the mobile terminal according to an exemplary embodiment.

FIG. 12 is a flow chart illustrating the process of a method for changing an icon positioned on the time graphics by using the event display apparatus of the mobile terminal according to an exemplary embodiment of the present invention.

First, the control unit 180 may determine whether an icon editing mode is selected by the user (S41). Here, the control unit 180 may provide control to enter the icon editing mode when a particular icon is clicked (selected) for a certain amount of time (e.g., two seconds) previously set by the user through the touch screen or the like. The control unit 180 may determine whether the icon editing mode is selected by the user via a hot key or a particular menu as well as via the touch screen.

When the icon editing mode is selected, the control unit 180 replaces an icon displayed on the time graphics with a new icon according to a user request. For example, when the particular icon displayed on the time graphics is selected, the control unit 180 may provide control to display various icons previously stored in the storage unit on the display module 151. When the particular icon is selected from the displayed icons by the user (S43), the previously displayed icon is deleted and the selected particular icon is displayed on the time graphics (S44).

In addition, when a delete key (or other delete function) is selected by the user after the particular icon displayed on the time graphics is selected, the control unit 180 may provide control to delete the selected particular icon. Here, when the particular icon is dragged out of the time graphics on the touch screen, the control unit 180 may provide control to delete the dragged particular icon. If one or more icons displayed on the time graphics are selected by the user through the touch screen and dragged out of (or moved away from) the time graphics, the control unit 180 may provide control to delete the one or more icons.

Figure 13:
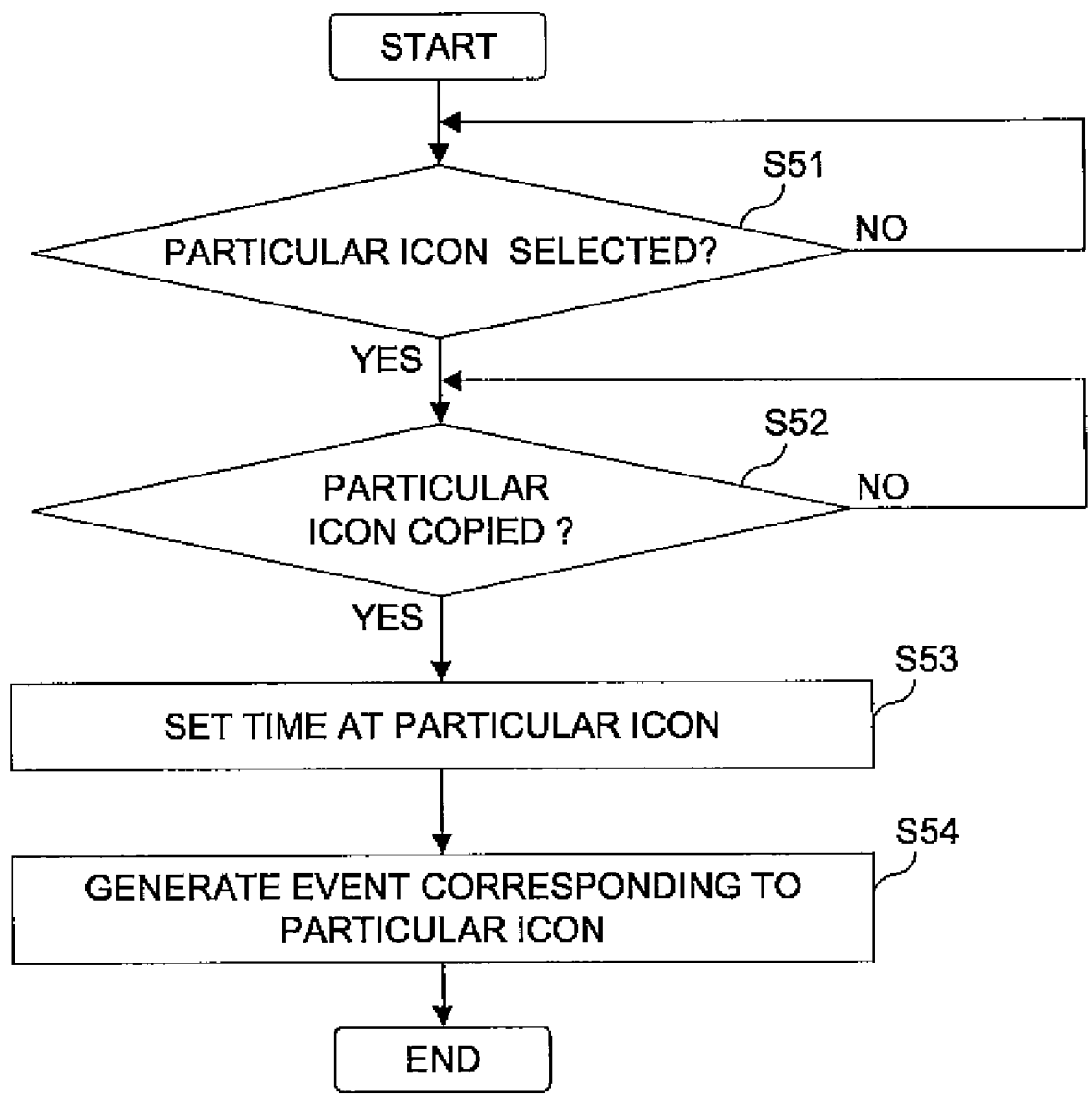
FIG. 13 is a flow chart illustrating the process of a method for generating an icon positioned on the time graphics by using the event display apparatus of the mobile terminal according to an exemplary embodiment.

FIG. 13 is a flow chart illustrating the process of a method for generating an icon positioned on the time graphics by using the event display apparatus of the mobile terminal according to an exemplary embodiment of the present invention.

First, the control unit 180 may determine whether a particular icon is selected by the user among icons displayed on the time graphics (S51).

If the particular icon is copied by the user and the copied icon is positioned (added) on a time line corresponding to a particular time zone by the user, the is control unit 180 sets the particular time zone at the copied icon (S53). When the particular time zone lapses, the control unit 180 may generate an event corresponding to the copied icon (S54). For example, if an icon (e.g., a certain icon corresponding to 4:00 p.m.) indicating a schedule displayed on the time graphics is copied by the user and the copied schedule icon is positioned on a time line corresponding to 5:00 p.m. by the user, when 5:00 p.m. is reached, the control unit 180 may provide control to generate an event corresponding to the schedule icon. Namely, after the event corresponding to the schedule icon at 4:00 p.m., when it is 5:00 p.m., the controller may provide control to generate an event corresponding to the schedule icon.

Figure 14:
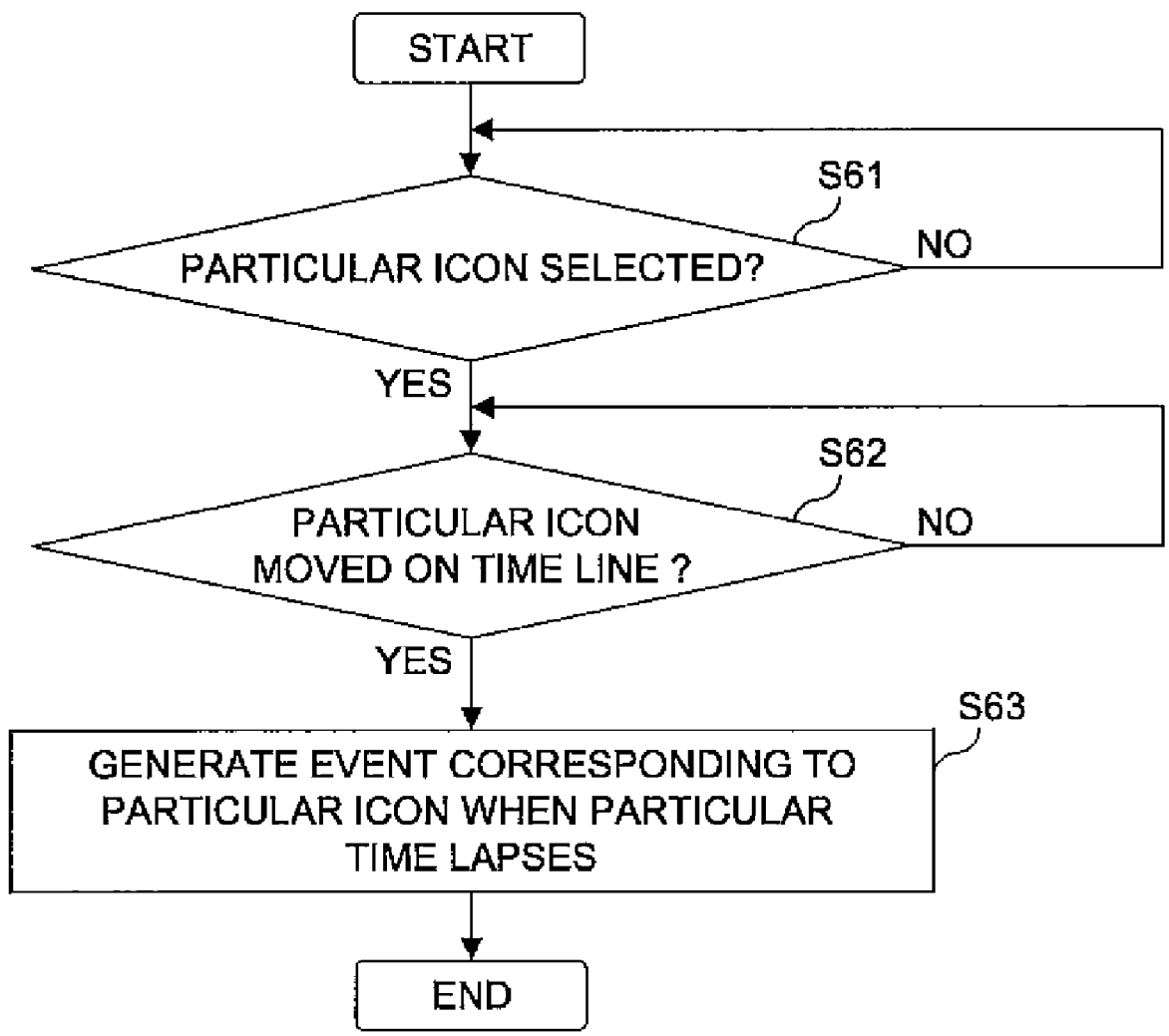
FIG. 14 is a flow chart illustrating the process of a method for moving an icon positioned on the time graphics by using the event display apparatus of the mobile terminal according to an exemplary embodiment.

FIG. 14 is a flow chart illustrating the process of a method for moving an icon positioned on the time graphics by using the event display apparatus of the mobile terminal according to an exemplary embodiment of the present invention.

First, the control unit 180 determines whether a particular icon is selected by the user among icons displayed on the time graphics (S61).

The controller 10 determines whether the particular icon displayed on the time graphics is moved on a time line corresponding to the particular time zone in a dragging manner by the user (S62).

After the particular icon is moved to be positioned on the time line corresponding to the particular time zone in a dragging manner by the user, when the particular time period lapses, the control unit 180 may provide control to generate an event corresponding to the dragged icon (S63). For example, if a wake-up call icon (e.g., a wake-up call at 4:00 a.m. has been reserved) displayed on the time graphic is dragged onto a time line corresponding to 5:00 a.m. by the user, the control unit 180 may provide control to generate an event corresponding to the wake-up call icon at 5:00 p.m. Namely, the control unit 180 provides control to execute the wake-up call at 5:00 a.m., and not at 4:00 a.m.

As so far described, the event display apparatus and method of the mobile terminal according to the exemplary embodiments of the present invention has at least the advantageous effect that various scattered events in the mobile terminal are detected and displayed on the time graphics for indicating the times according to types of the detected events, so the events can be more easily viewed and managed.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. An event display method of a mobile terminal comprising:
    detecting events in the mobile terminal;
    displaying time graphics on a screen;
    positioning the detected events on the time graphics according to their types;
    reducing the time graphics including an event when the event positioned on the time graphics is selected; and
    displaying information of the selected event together with the reduced time graphics on the screen.

2. The method of claim 1, wherein, in positioning the detected event on the time graphics, an icon corresponding to the detected event is displayed on the time graphics.

3. The method of claim 1, wherein the positioning of the detected event on the time graphics comprises:
    classifying time lines of the time graphics according to types of events; and
    displaying an icon corresponding to an event requested by a user on the classified time line.

4. The method of claim 1, further comprising:
    linking a time line included in the time graphics to broadcast program information based on broadcast program time information included in the broadcast program information.

5. The method of claim 1, further comprising:
    if a specific icon is dragged out of the time graphics on the screen, deleting the dragged icon.

6. An event display apparatus of a mobile terminal comprising:
a control unit configured to determine the type of event for each detected event when events are detected, to display time graphics on a display module of the mobile terminal, and to position the detected events on the time graphics according to their types of events,
wherein the control unit is further configured to reduce the time graphics including an event when the event positioned on the time graphics is selected and to display information of the selected event together with the reduced time graphics on a screen of the display module.

7. The apparatus of claim 6, wherein the control unit displays an icon corresponding to the detected event on the time graphics.

8. The apparatus of claim 7, wherein if an icon displayed on the time graphics is copied and the copied icon is positioned on a time line corresponding to a particular time period, when the particular time period lapses, the control unit provides control to generate an event corresponding to the copied icon.

9. The apparatus of claim 7, wherein if the icon displayed on the time graphics is dragged to be positioned on the time line corresponding to the particular time period, when the particular time period lapses, the control unit provides control to generate an event corresponding to the dragged icon.

10. The apparatus of claim 7, wherein the control unit provides control to count the number of receptions or originations of the same phone numbers carried out on a date selected by the user and display the name of persons corresponding to the phone numbers in the order, starting from the person from or to which calls have been most frequently received or originated based on the counted number in the order of time lines, starting from the innermost or outermost time line.

11. The apparatus of claim 6, wherein if a specific icon is dragged out of the time graphics on the screen, the control unit deletes the dragged icon.

* * * * *